US005727864A

United States Patent [19]

Stelling et al.

[11] Patent Number: 5,727,864
[45] Date of Patent: Mar. 17, 1998

[54] MOTORCYCLE LIGHT SUPPORT ASSEMBLY

[75] Inventors: John E. Stelling, Port Washington; Brian M. Scherbarth, Menomonee Falls, both of Wis.

[73] Assignee: Harley-Davidson Motor Company, Milwaukee, Wis.

[21] Appl. No.: 676,565

[22] Filed: Jul. 8, 1996

[51] Int. Cl.[6] .................................. B62J 6/02; B62J 3/00
[52] U.S. Cl. ............................ 362/72; 362/285; 340/432
[58] Field of Search .............................. 362/61, 72, 80, 362/285, 83.3, 190, 184, 431, 287; 340/432

[56] References Cited

U.S. PATENT DOCUMENTS

| 1,847,115 | 3/1932 | Kummerele et al. | 340/432 |
|---|---|---|---|
| 2,790,157 | 4/1957 | Guest et al. | 340/432 |
| 2,931,028 | 3/1960 | Propst | 340/432 |
| 3,099,400 | 7/1963 | Holmes | 362/72 |
| 5,355,746 | 10/1994 | Lin | 362/72 |
| 5,418,696 | 5/1995 | Izzo, Sr. | 362/72 |

FOREIGN PATENT DOCUMENTS

| 508645 | 10/1952 | Belgium | 340/432 |
|---|---|---|---|
| 636375 | 9/1936 | Germany | 340/432 |
| 838559 | 4/1952 | Germany | 340/432 |
| 3741662 | 6/1989 | Germany | 340/432 |

OTHER PUBLICATIONS

*Harley-Davidson*, author Tony Middlehurst, published 1992, pp. 53 and 97.

Tony Middlehurst, Harley-Davidson, 1990 pp. 53, 75, 97.

*Primary Examiner*—Thomas M. Sember
*Attorney, Agent, or Firm*—Michael, Best & Friedrich LLP

[57] ABSTRACT

A motorcycle light support assembly for mounting two lights to a motorcycle. The assembly includes a light support bar having two ends separated from each other in a first direction, wherein a second direction is substantially perpendicular to the first direction. Two light support members are secured to the two ends of the light bar, and each light support member includes an elongated orifice that is longer in the second direction than in the first direction. A horn support bracket is connected to the light bar and is adapted to support a horn. Preferably, the horn support bracket includes a horn attaching portion for supporting a horn, a frame attaching portion adapted to engage a motorcycle frame, and an intermediate portion between the horn attaching and frame attaching portions.

21 Claims, 3 Drawing Sheets

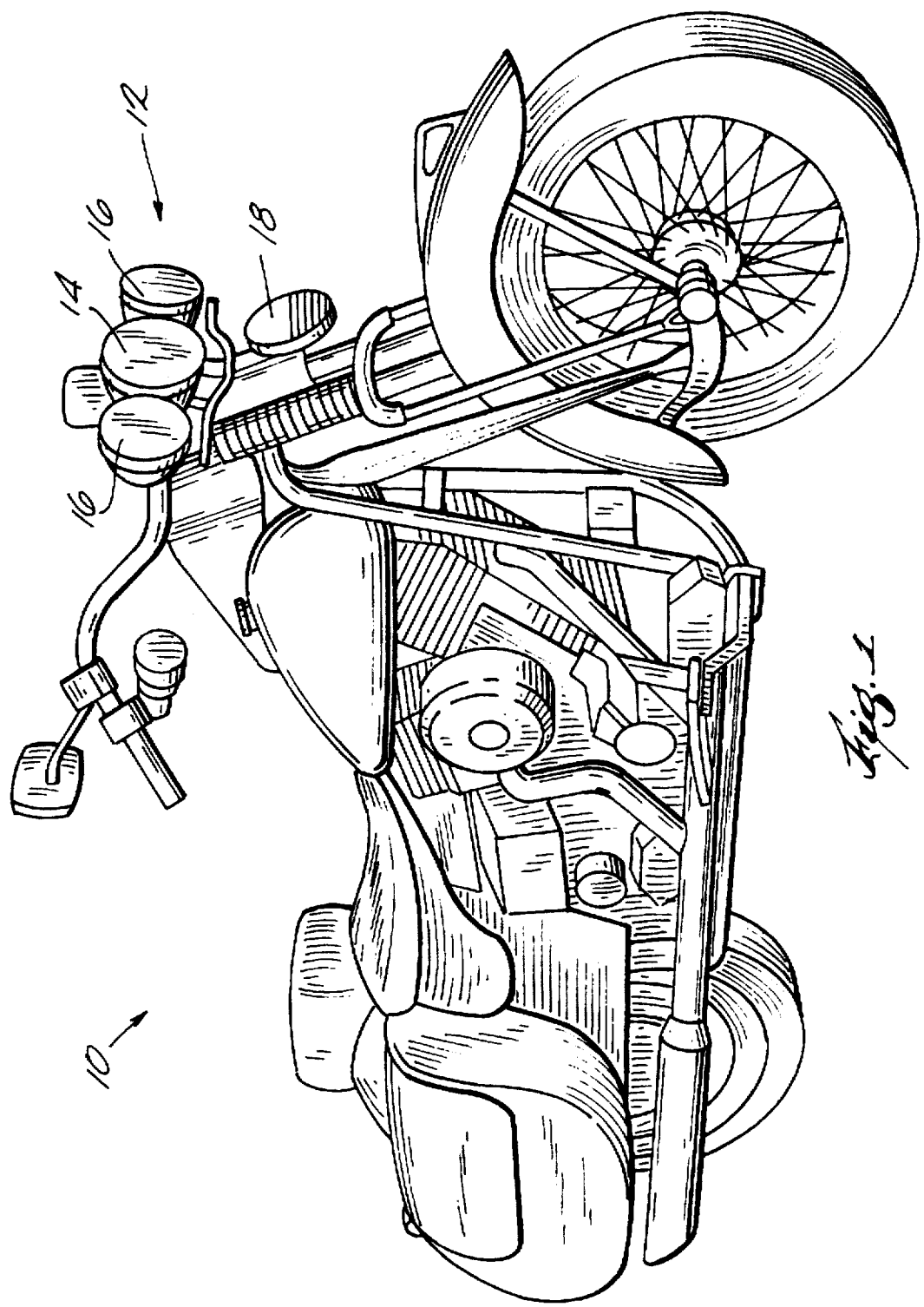

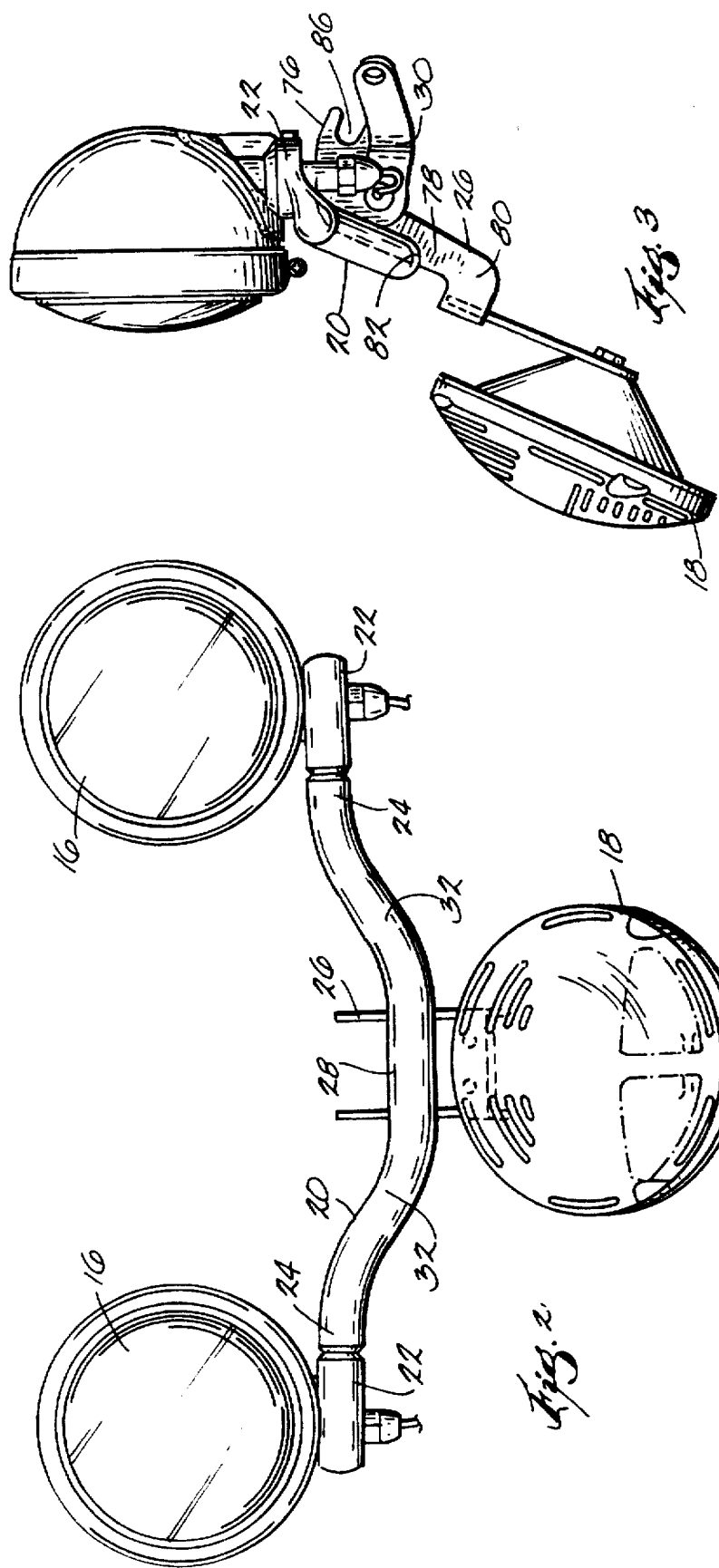

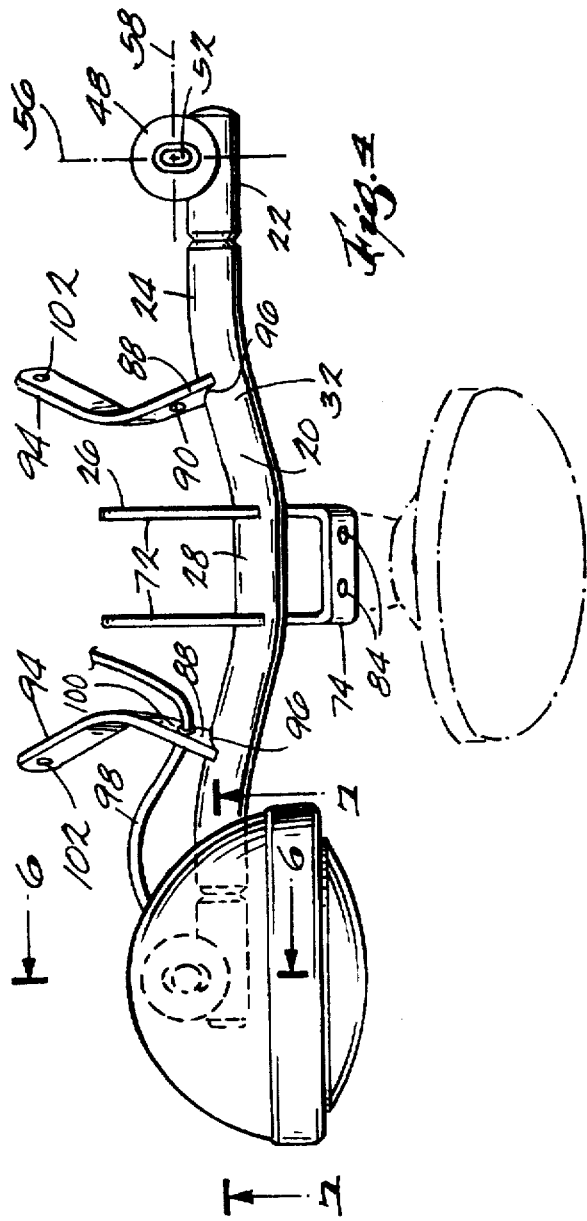
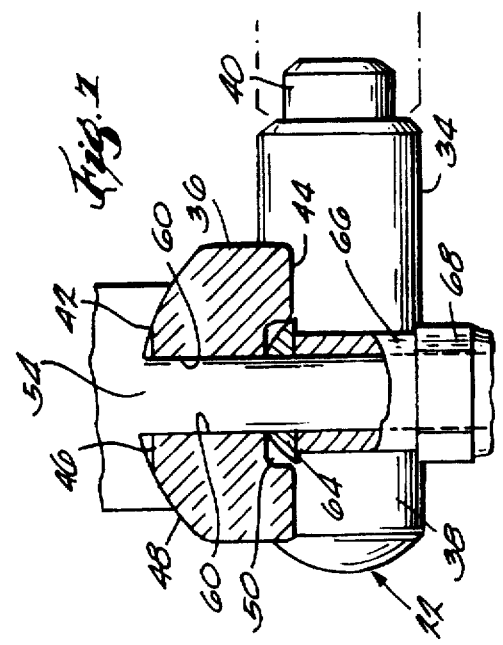
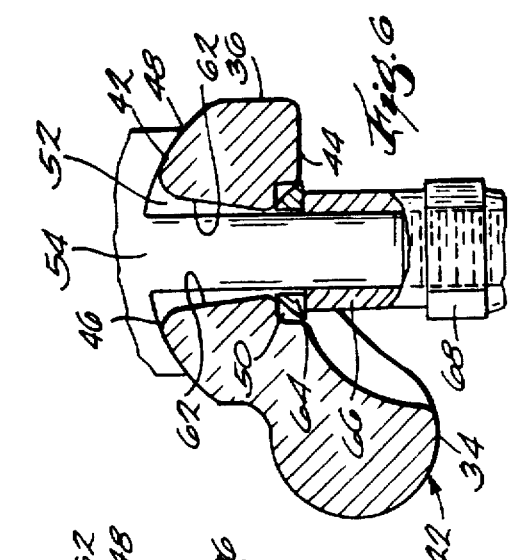
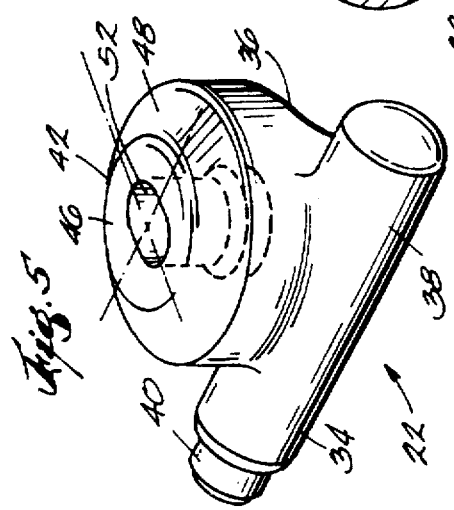

MOTORCYCLE LIGHT SUPPORT ASSEMBLY

FIELD OF THE INVENTION

The present invention generally relates to the field of motorcycles, and more specifically to the field of mounting systems for motorcycle lights and horns.

BACKGROUND OF THE INVENTION

Motorcycles designed for road use include lights and horns for obvious safety reasons and to meet government regulations. Lights are commonly mounted on both the front and rear of motorcycles, and horns are mounted at various locations on the motorcycle frame.

Some motorcycles are provided with more than one light on either the front or rear, or on both the front and the rear of the motorcycle. For example, the front of some motorcycles includes two passing lights, and the rear of most motorcycles includes two directional lights. Commonly, the two lights are mounted an equal distance on opposing sides of the center of the motorcycle. For example, the lights can be mounted on a light support bar that extends laterally across the motorcycle and that is mounted to the motorcycle frame. Historically, such mounting of the lights to the light support bar is accomplished using a band clamp wrapped around each end of the light support bar. The lights each include a threaded post that is inserted through a hole in the corresponding band clamp. A securing nut is threaded onto each light post to simultaneously secure the light to the band clamp and tighten the band clamp to the light support bar.

Horns are typically secured to a horn support bracket. Horn support brackets can be secured at many locations on the motorcycle, but are commonly mounted to the motorcycle frame near the front of the motorcycle.

SUMMARY OF THE INVENTION

One problem with the above-describe mounting system is that adjustment of the position of the lights can cause damage to the light support bar. More specifically, fore/aft adjustment of the lights is performed by loosening the securing nut until the band clamp is loose, and rotating the band clamp relative to the light support bar. Such rotation can scratch or otherwise damage the light support bar or its protective coating (e.g., chrome, paint or oxide finish). Further, the tightening of the band clamp around the light support bar can scratch or otherwise damage the light support bar. In either event, the damage can create a cosmetic reject or create an area for potential corrosion.

Another drawback to the above-describe system is that, in order to mount the horn at the front of the motorcycle, the horn support bracket typically must weave its way from the motorcycle frame through other components. For example, the horn support bracket may need to pass around the light support bar or other components in order to locate the horn in a prominent position at the front of the motorcycle. The result is often a complicated and unduly heavy horn mounting bracket.

To alleviate the above-noted problems, the present invention provides a motorcycle light support assembly for mounting two lights to a motorcycle. The assembly includes a light support bar having two ends separated from each other in a first direction, wherein a second direction is substantially perpendicular to the first direction. Two light support members are secured to the two ends of the light bar, and each light support member includes an elongated orifice that is longer in the second direction than in the first direction. Preferably, the light support member are formed separate from the light support bar, but they could also be formed integrally with the light support bar.

In one embodiment, the elongated orifices each are defined by front and rear walls separated from each other in the second direction, and side walls separated from each other in the first direction, wherein the front and rear walls are angled relative to each other, and wherein the side walls are substantially parallel to each other. The light support members each include an arcuate mounting surface (e.g., a frusto-spherical surface) for engaging with a corresponding surface on a light.

In another aspect, the present invention provides a motorcycle light support assembly for mounting two lights and a horn to a motorcycle. The assembly includes a light support bar having two ends, two light support members, one secured to each of the two ends of the light bar, and a horn support bracket connected to the light bar and adapted to support a horn. Preferably, the horn support bracket includes a horn attaching portion for supporting a horn, a frame attaching portion adapted to engage a motorcycle frame, and an intermediate portion between the horn attaching and frame attaching portions, the intermediate portion being connected to the light support bar. For example, the intermediate portion of the horn support bracket can include an arcuate recess adapted to engage the light support bar.

BRIEF DESCRIPTION OF THE DRAWINGS

FIG. 1 is perspective view of a motorcycle having a light support assembly embodying the present invention.

FIG. 2 is a front view of the light support assembly supporting lights and a horn.

FIG. 3 is a side view of the light support assembly shown in FIG. 2.

FIG. 4 is a top view of the light support assembly shown in FIG. 2 with one light, horn and horn mounting bracket removed.

FIG. 5 is a perspective view of a light support member.

FIG. 6 is a section view taken along line 6—6 in FIG. 4.

FIG. 7 is a section view taken along line 7—7 in FIG. 4.

DETAILED DESCRIPTION

FIG. 1 illustrates a motorcycle 10 having a light support assembly 12 embodying the present invention. The light support assembly 12 is attached to the fore section of the motorcycle 10, under a central light 14, and supports two side lights 16 and a horn 18.

FIGS. 2-7 illustrate the light support assembly 12 in more detail. The assembly 12 generally includes a light support bar 20, light support members 22 secured to end portions 24 of the light support bar 20, a horn support bracket 26 secured to a central portion 28 of the light support bar 20, and mounting straps 30 secured to angled portions 32 of the light support bar 20.

The light support bar 20 is of circular cross section having an outer diameter of about 0.750 inches, an inner diameter of about 0.532 inches, and overall length of about 10 inches. The straight central portion 28 of the light support bar 20 is of sufficient length (e.g., about 3.5 inches) to provide a surface for attaching the horn support bracket 26, and to allow for clearance around the central light 14 of the motorcycle 10. The bar 20 is made of polished AISI 1020 steel tubing. The light support bar 20 is curved at either end of the central portion 28 at an angle of about 37 degrees to form the two angled portions 32 of the light support bar. Each angled portion of the light support bar is of sufficient length (e.g., 2.00 inches) to allow the center of the side lights 16 supported by the light support bar to be at an even level with the central light 14 of the motorcycle 10. The light support bar is curved at the outer ends of the angled portions 32 to form the end portions 24 of the light support bar which are substantially parallel to the central portion 28. The ends of the end portions 24 are beveled.

Referring to FIGS. 5–7, each light support member 22 is a cast part made of ASTM A216 steel having a cylindrical attachment portion 34 and a mounting portion 36. The attachment portion 34 features a large diameter portion 38 and a smaller diameter lug portion 40. The outer end of the large diameter portion 38 opposite the lug portion 40 is rounded. The large diameter portion is of substantially the same diameter as the outer diameter of the light support bar, and is beveled similar to the end portions 24 of the light support bar. The lug is of reduced diameter from the large diameter portion and is beveled to facilitate insertion into the end of the light support bar. The beveled surfaces of the large diameter portion and the light support bar are positioned adjacent each other when the lug is inserted into the end of the light support bar (FIGS. 4 & 7). The two adjacent beveled ends are then welded and ground flush to provide a smooth continuous surface.

The mounting portion 36 is centered about 0.840 inches behind the attachment portion 34 of the light support member, and includes a top surface 42 and a bottom surface 44. The top surface 42 features a circular platform 46 and a frusto-spherical mounting surface 48 around its perimeter. The bottom surface 44 of the mounting portion 36 is generally flat and features a circular recess 50. The circular recess 50 is concentric with an elongated orifice 52 which passes through the light support member 22.

The elongated orifice 52 is positioned at the center of the mounting portion 36 of the light support member 22, and is designed to insertably receive a light mounting post 54 of one of the side lights 16. Referring to FIG. 4, the major dimension of the orifice 52 runs in the fore and aft direction 56 and the minor dimension in the side to side direction 58. The minor dimension of the orifice 52 is defined by two side walls 60, and is substantially constant from the top surface 42 to the bottom surface 44 of the mounting portion 36. In this regard, the two side walls 60 are substantially parallel. The minor dimension is slightly larger than the diameter of the light mounting post 54 to give the light mounting post 54 a relatively snug fit to inhibit tilting of the side light 16 in the side to side direction 58.

The major dimension of the orifice 52 is defined by front and rear walls 62 that are angled relative to each other. The resulting major dimension tapers from about 0.480 inches in diameter at the top surface 42 to about 0.400 inches in diameter at the bottom surface 44. The major dimension of the orifice 52 allows the light mounting post 54 to tilt in the fore and aft direction 56 in a pivoting motion about an imaginary axis positioned approximately at the bottom surface 44 of the light support member 22.

The side lights 16 are each attached to the light support members 22 by a clamp block 64 and a clamp nut 68. The clamp block 64 and the spacer 66 each has a cylindrical aperture which allows the light mounting post 54 to pass through it with a relatively snug fit. Referring to FIG. 6, the light mounting post 54 passes through the elongated orifice 52 in the light support member 22, then through the clamp block 64 and clamp nut 68. The clamp block 64 has a frusto-spherical surface 71, and is of smaller diameter than the circular recess 50 in the light support members 22. The clamp block 64 is positioned within the circular recess 50 so the frusto-spherical surface 71 contacts the recessed bottom surface 44 of the light support member 22. The overall thickness of the clamp block 64 is substantially the same as the depth of the circular recess 50. The clamp nut 68 includes a cylindrical portion 66 and is threaded onto the end of the light mounting post 54, thereby bearing against the clamp block 64. This causes the side light 16 to be secured to the light support member 22. Each side light 16 can be tilted in the fore and aft direction 56 by loosening the clamp nut 68, tilting the light posts 54, then re-tightening the clamp nut 68.

The horn support bracket 26 is made of AISI 1010 steel and has two parallel members 72 and a cross member 74. The parallel members 72 each feature a frame attaching portion 76, a light support bar attaching portion 78, and a horn attaching portion 80. The parallel members 72 are substantially straight at the light support bar attaching portion 78, and are curved about 90 degrees in the fore direction below the light support bar attaching portion 78, and are curved 90 degrees in the aft direction above the light support bar attaching portion 78. There is a semi-circular recess 82 having radius of about 0.375 inches formed into the front side of the light support bar attaching portion 78, which allows the bracket 26 to be attached (e.g., by welding) to the rear surface of the light support bar 20. The cross member 74 consists of a rectangular shaped piece which joins the ends of the two parallel members 72. The cross member 74 features two circular holes 84 through which the horn 18 may be attached to the bracket 26 by an appropriate fastener. The frame attaching portion 76 of the horn support bracket 26 features an elongated semi-circular recess 86 which allows the horn support bracket 26 to be attached to the outside of the upper shock mounting (not shown) of the motorcycle 10.

The mounting straps 30 are connected to the outer ends of the angled portion 32 of the light support bar 20. The mounting straps 30 are made of 0.1196 polished steel and are about 2.26 inches in overall length, and 0.750 inches wide. The mounting straps 30 each include a light support bar attachment portion 88, a wire pass-through hole 90, and a motorcycle attachment portion 94. The light support bar attachment portion 88 has a concave end 96 to facilitate attachment (e.g., by welding) to the light support bar 20. The wire pass-through hole 90 is a circular hole about 0.38 inches in diameter located about 0.75 inches to the rear of the concave end of the light support bar attachment portion 88. The hole 90 allows electrical wires 98 from the side light 16 mounted on the light support assembly 12 to pass through the mounting strap 30, thereby preventing the wires 98 from hanging down. A resilient grommet 100 is positioned in the wire pass-through hole 90 to inhibit wear between the wire 98 and the mounting strap 30. The width of the mounting strap 30 is enlarged around the wire pass-through hole 90 to prevent stress concentration to form near the hole 90. The motorcycle attachment portion 94 features a 0.340 inch diameter motorcycle attachment hole 102, which is centered near the end of the mounting strap 30, and which facilitates attachment to the rigid fork assembly (not shown) of the motorcycle 10.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. For example, the light support members could be formed integrally with the light support bar, rather than separately as described. In addition, since tilting is substantially limited to a single plane, the frusto-spherical surfaces could be cylindrically arcuate instead. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle light support assembly for mounting two lights to a motorcycle, the assembly including:

a light support bar having two ends separated from each other in a first direction, wherein a second direction is substantially perpendicular to the first direction;

two light support members, one secured to each of said two ends of said light support bar, wherein each light support member includes an orifice extending through said support member in a third direction substantially perpendicular to said second direction, wherein said orifice is longer in the second direction than in the first direction; and a light member mounted on each of said support members and including a mounting post extending through said orifice and being tiltable relative to said orifice about an axis that is substantially parallel to the first direction.

2. A motorcycle light support assembly as claimed in claim 1, wherein said light support members are formed separate from said light support bar.

3. A motorcycle light support assembly as claimed in claim 1, wherein said elongated orifices each are defined by front and rear walls separated from each other in the second direction, and side walls separated from each other in the first direction, wherein said front and rear walls are angled relative to each other, and wherein said side walls are substantially parallel to each other.

4. A motorcycle light support assembly as claimed in claim 1, wherein said light support members each include an arcuate mounting surface for engaging with a corresponding surface on said light member.

5. A motorcycle light support assembly as claimed in claim 4, wherein said arcuate mounting surface is spherically shaped.

6. A motorcycle light support assembly as claimed in claim 1, further comprising a horn support bracket secured to said light bar and adapted to support a horn.

7. A motorcycle light support assembly as claimed in claim 6, wherein said horn support bracket includes a frame attaching portion adapted to engage a motorcycle frame.

8. A motorcycle light support assembly for mounting two lights and a horn to a motorcycle, said assembly including:

a light support bar having two ends;

two light support members, one secured to each of said two ends of said light bar; and a horn support bracket connected to said light bar and adapted to support the horn, said horn support bracket including:

a horn attaching portion for supporting the horn;

a frame attaching portion adapted to engage a motorcycle frame; and an intermediate portion between the horn attaching and frame attaching portions, said intermediate portion being connected to said light support bar.

9. A motorcycle light support assembly as claimed in claim 8, wherein said light support members are formed separate from said light support bar.

10. A motorcycle light support assembly as claimed in claim 8, wherein said light support bar includes a cylindrical central portion, and wherein said intermediate portion of said horn support bracket includes an arcuate recess engaged with said cylindrical central portion of said light support bar.

11. A motorcycle comprising:

a frame having a front, a rear and two sides, wherein a first direction is defined between said two sides and a second direction is defined between said front and rear;

a front wheel rotatably interconnected with said frame;

handlebars interconnected with said front wheel for facilitating rotation of said front wheel;

a light support bar distinct from said handlebars and connected to said frame, said light support bar having two ends separated from each other in the first direction;

two light support members, one being secured to each of said two ends of said light support bar, wherein each light support member includes an orifice extending through said light support member in a third direction substantially perpendicular to said second direction, said orifice being longer in the second direction than in the first direction; and two lights, one supported by each of said light support members, each light including:

a housing for enclosing a light source; and a mounting post connected to said housing and positioned through said corresponding orifice, said mounting post being tiltable relative to said orifice about an axis that is substantially parallel to the first direction.

12. A motorcycle as claimed in claim 11, wherein said light support members are formed separate from said light bar.

13. A motorcycle as claimed in claim 11, wherein said elongated orifices each are defined by front and rear walls separated from each other in the second direction, and sides walls separated from each other in the first direction, wherein said front and rear walls are angled relative to each other, and wherein said side walls are substantially parallel to each other.

14. A motorcycle as claimed in claim 11, wherein said light support members each include an arcuate mounting surface, and wherein said lights each include a corresponding arcuate mounting surface.

15. A motorcycle as claimed in claim 14, wherein said arcuate mounting surfaces are spherically shaped.

16. A motorcycle as claimed in claim 11, further comprising:

a horn support bracket secured to said light support bar; and a horn secured to said horn support bracket.

17. A motorcycle as claimed in claim 16, wherein a top of said motorcycle defines an upward direction and a bottom of said motorcycle defines a downward direction, and wherein said horn support bracket includes a horn attaching portion extending downwardly and frontwardly from said light support bar.

18. A motorcycle as claimed in claim 17, wherein said horn support bracket further includes a frame attaching portion extending upwardly and rearwardly from said light support bar.

19. A motorcycle comprising:

a frame having a front, a rear and two sides, wherein a first direction is defined between said two sides and a second direction is defined between said front and rear;

a light support bar connected to said frame, said light support bar having two ends separated from each other in the first direction;

two light support members, one being secured to each of said two ends of said light support bar, wherein each light support member includes an elongated orifice that is longer in the second direction than in the first direction, wherein each said elongated orifice is defined by front and rear walls separated from each other in the second direction, and sides walls separated from each other in the first direction, wherein said front and rear walls are angled relative to each other, and wherein said side walls are substantially parallel to each other; and two lights, one supported by each of said light support members, each light including:
- a housing for enclosing a light source; and
- a mounting post connected to said housing and positioned through said corresponding orifice.

20. A motorcycle comprising:

a frame having a front, a rear and two sides, wherein a first direction is defined between said two sides and a second direction is defined between said front and rear;

a light support bar connected to said frame, said light support bar having two ends separated from each other in the first direction;

two light support members, one being secured to each of said two ends of said light support bar, wherein each light support member includes an elongated orifice that is longer in the second direction than in the first direction, wherein said light support members each include an arcuate mounting surface, and wherein said lights each include a corresponding arcuate mounting surface for facilitating tilting of said light in the second direction; and two lights, one supported by each of said light support members, each light including:
- a housing for enclosing a light source; and
- a mounting post connected to said housing and positioned through said corresponding orifice.

21. A motorcycle as claimed in claim 20, wherein said arcuate mounting surfaces are spherically shaped.

* * * * *